July 16, 1940.   A. W. DAVIS   2,208,121
APPARATUS FOR AND METHOD OF CONTROLLING DISTORTION
Filed April 24, 1937

INVENTOR
ARTHUR W. DAVIS
BY
ATTORNEY

Patented July 16, 1940

2,208,121

UNITED STATES PATENT OFFICE 2,208,121

APPARATUS FOR AND METHOD OF CONTROLLING DISTORTION

Arthur W. Davis, Lakewood, Ohio, assignor to The Linde Air Products Company, a corporation of Ohio Application April 24, 1937, Serial No. 138,712

6 Claims. (Cl. 148—9)

This invention relates to apparatus for and a method of controlling distortion of a metal part while it is being flame cut. The invention is particularly useful in cutting longitudinally the web of an I-beam or H column, or in making long cuts in plates with a shape cutting machine; but the invention is not limited to such applications.

In welding operations, distortion has heretofore been prevented or minimized by preheating the parts to be welded, by applying a wet pack to the parts, or by applying a stream of cooling fluid to each part adjacent the point of welding. Such operations, however, have had as their principal function prevention of buckling, since the weld itself holds the parts together. So far as is known, however, no attempts have been made in the past to prevent distortion of metal which is undergoing a flame cutting operation. In performing a cutting operation, the severed edges are not held together and are accordingly free to become distorted in three dimensions immediately after being severed. It will be apparent that in making long cuts, as in cases where metal of great length is being cut, say fourteen feet or over, distortion of the metal may attain undesirable proportions.

One object of the invention, therefore, is to control or prevent distortion of metal parts as they are being severed by flame cutting. Another object is the provision for this purpose of an apparatus which may be easily carried by a cutting machine and which may operate therewith. A further object is the provision of such apparatus in simple, rugged, convenient, and easily maintained form. Other objects and the novel features of the invention will be apparent from the present specification.

The invention is illustrated, for simplicity, in its application to cutting metal plates in the accompanying drawing, in which.

In accordance with the invention, a cooling spray is applied to the metal immediately adjacent the cutting nozzle and concurrently with the cutting operation. This spray cools the metal immediately after it is cut. No time is therefore allowed for highly heated metal to become distorted, and to produce severed parts which may not be usable.

Figure 1:
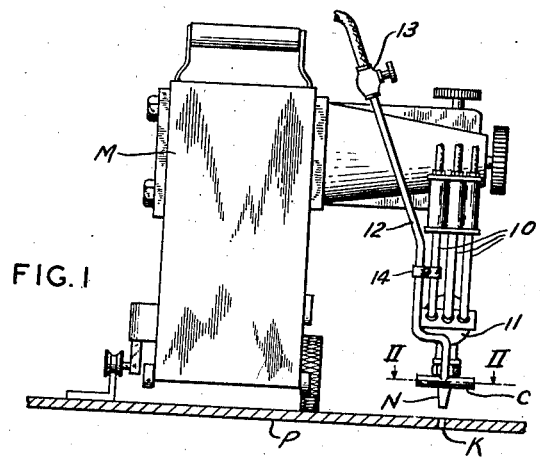
Fig. 1 is a rear view of a cutting machine to which apparatus in accordance with the invention has been applied.
Figure 2:
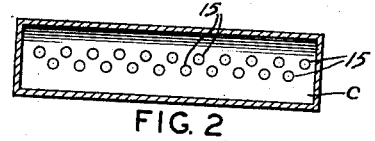
Fig. 2 is a fragmental horizontal section taken on the line II—II of Fig. 1.

In the embodiment illustrated in Figs. 1 and 2, there is shown a self-propelled cutting machine M supported on a plate P in well known manner. The cutting machine M carries, in known or convenient manner, a cutting nozzle N substantially vertically and in a position to project a jet of cutting fluid or oxidizing gas downwardly from its lower end upon portions of the plate P heated to an ignition temperature so as to make a cut K therein. A spray conduit or cooling fluid nozzle C is disposed transversely behind the cutting nozzle N adjacent its lower end, the position of the spray conduit being substantially horizontal and at right angles to the axis of the cutting nozzle. The spray conduit is perforated on its under side in order that it may project a cooling fluid downwardly upon the plate P. If the apparatus, in the position shown in Fig. 1, be moved in the direction away from the observer, the cutting nozzle N may be caused to flame-cut the plate P beneath it along a path which is determined by the direction in which the cutting machine M moves. At the same time, the spray conduit C may be caused to project a spray of cooling fluid immediately behind and across the path of the cutting nozzle N, thus cooling at once the cut edges on either side of the cut K and preventing their distortion.

Although any appropriate cooling fluid may be employed, for convenience the cooling fluid used will be referred to hereafter as water. Water, or a similarly inert cooling fluid, is particularly efficacious in that it will not combine chemically with the highly heated metal of the walls of the cut or kerf K. Also, an inert cooling fluid such as water will not combine chemically with the fuel or combustible gas of the preheating flame or flames which are normally used to assist in maintaining the metal in the cutting zone at the desired high temperature.

The gases used by the blowpipe nozzle N are carried thereto by a plurality of tubes 10, the fuel gas and the combustion-supporting gas for the preheating flames being mixed in a mixer 11 immediately adjacent the nozzle N. A water supply tube 12 having a control valve 13 therein is attached to the assembly, as by a bracket 14 fastened to one of the tubes 10, and terminates in the spray conduit C which it is adapted to supply with water.

The spray conduit C is of sufficient length to extend an appreciable distance on either side of the cutting nozzle N, and has a series of openings 15 on its under side (see Fig. 2) for projecting the cooling water therein upon the cut edges of the plate P.

The operation of the apparatus will be at once apparent. When the usual heating jets have brought the plate P to ignition temperature, the cutting fluid valve is opened and the nozzle projects a jet of cutting fluid upon the plate starting the cut K therein. The cooling water control valve 13 is then opened and cooling water, passing through the supply tube 12, enters the spray conduit C and is projected through the openings 15 upon the plate P immediately behind the cutting nozzle N. The cutting machine M is then started and the cut K is continued over any chosen path along the plate P. At the same time the spray of cooling water is constantly projected upon both of the cut edges at right angles to the cut and immediately behind the cutting jet, thereby cooling the edges as soon as they have been cut and preventing distortion thereof.

Figure 4:
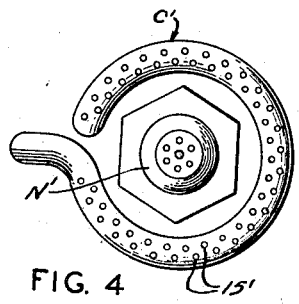
Fig. 4 is a view of the form of the invention shown in Fig. 3 as seen from below.
Figure 3:
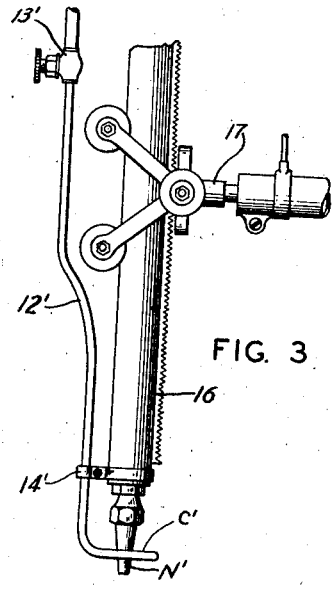
Fig. 3 is an elevation showing another form of the invention.

In the form of the invention which is illustrated in Figs. 3 and 4, there is shown a nozzle N' attached to a blowpipe 16 which is carried by an adjustable supporting mechanism 17 such as that which is ordinarily used with a shape-cutting machine. In this embodiment, the nozzle N' is surrounded at the proper elevation by an annular spray conduit C'. Water is carried to the spray conduit by a supply tube 12', which is, in fact, a continuation of the conduit C'. The supply tube 12' is fastened to the blowpipe by means of a bracket 14'; and a valve 13' in the tube controls the flow of water to the spray conduit C'. The conduit C' has in its lower side a series of openings 15' such as those which are provided in the conduit C. These perforations permit the spray conduit to project a spray of cooling water downwardly against the metal as it is cut. The annular pipe or spray conduit C' is of peculiar advantage in connection with a shape-cutting machine, since no matter what the direction in which the nozzle N' is moved and no matter how often this direction may be changed, the annular spray conduit will always project a spray of cooling water upon the metal immediately after it is cut, thereby achieving an important object of the invention.

In each of the embodiments which are illustrated, the perforations in the spray conduit have their axes parallel to the major axis of the cutting nozzle. As a result, the jets are projected from the spray conduits in a direction substantially parallel to that of the blowpipe jet. It is accordingly possible to position the spray conduit exceedingly close to the nozzle in all cases and to project the spray upon the metal in close proximity to the cutting jet without interfering with the cutting action of the nozzle.

From the foregoing, it will be apparent that the invention provides simple, rugged, durable and easily maintained equipment whereby distortion of the work may be prevented by means of a cooling spray. Furthermore, the action of the spray is always properly related to that of the blowpipe nozzle, since change in the position of the nozzle necessarily provides at the same time a corresponding change in the position of the spray conduit C or C'.

Clearly, the apparatus is not necessarily used for projecting a spray of water. Furthermore, it is to be appreciated that the forms of the invention here illustrated and described, and the method here described for preventing distortion, are presented merely to indicate how the invention may be applied. Other forms and other methods differing in detail, but not in substance, from those here disclosed will, of course, readily suggest themselves to those skilled in the art.

I claim:

1. A method of preventing distortion of work being cut by a blowpipe, said method comprising projecting a spray of cooling water substantially at right angles to the cut and immediately behind the cutting jet.

2. A method of preventing distortion of work being cut by a blowpipe, said method comprising projecting a spray of cooling water upon the work immediately surrounding the cutting jet.

3. A method of controlling the distortion of a metal body severed by oxy-acetylene cutting, such method comprising directing an inert cooling liquid such as water onto said metal body adjacent the point of cutting so as to retard the flow of heat to portions of said body spaced from the point of cooling, said inert cooling liquid being adapted to effect cooling of portions of said body without combining chemically with the combustible gas of the preheating flame and also being adapted to cool the kerf produced by cutting without combining chemically with the highly heated metal of the walls of said kerf.

4. Apparatus for controlling distortion of ferrous metal work during flame cutting comprising, in combination, a blowpipe provided with a cutting nozzle adapted to discharge a cutting jet of oxidizing gas against portions of said work heated to an ignition temperature; a nozzle for directing cooling fluid substantially perpendicularly against the surface of the work and near to but spaced from the point of impingement of the cutting jet, such cooling fluid nozzle having in the underside thereof a plurality of fluid discharge openings disposed in staggered relation and in a plurality of rows for directing a plurality of closely adjacent jets of cooling fluid against said surface; and means for supplying a cooling fluid to said cooling fluid nozzle.

5. In apparatus for cutting ferrous metal work, the combination of a blowpipe provided with a cutting nozzle adapted to discharge a cutting jet of oxidizing gas against portions of said work heated to an ignition temperature; a nozzle for directing cooling fluid against an area on such work close to and surrounding the point of impingement of said cutting jet, such cooling fluid nozzle having in the underside thereof a plurality of fluid discharge openings disposed in staggered relation and in a plurality of rows for directing a plurality of closely adjacent jets of cooling fluid against said area of work; and means for supplying cooling fluid to said cooling fluid nozzle.

6. A method of controlling distortion of ferrous metal work during flame cutting comprising directing a cutting jet of oxidizing gas against portions of said work heated to an ignition temperature; and directing a cooling fluid substantially perpendicularly against the surface of the work and near to but spaced from the point of impingement of the cutting jet, such cooling fluid being directed in the form of a plurality of closely adjacent jets disposed in staggered relation and in a plurality of rows.

ARTHUR W. DAVIS.